Figure 1:
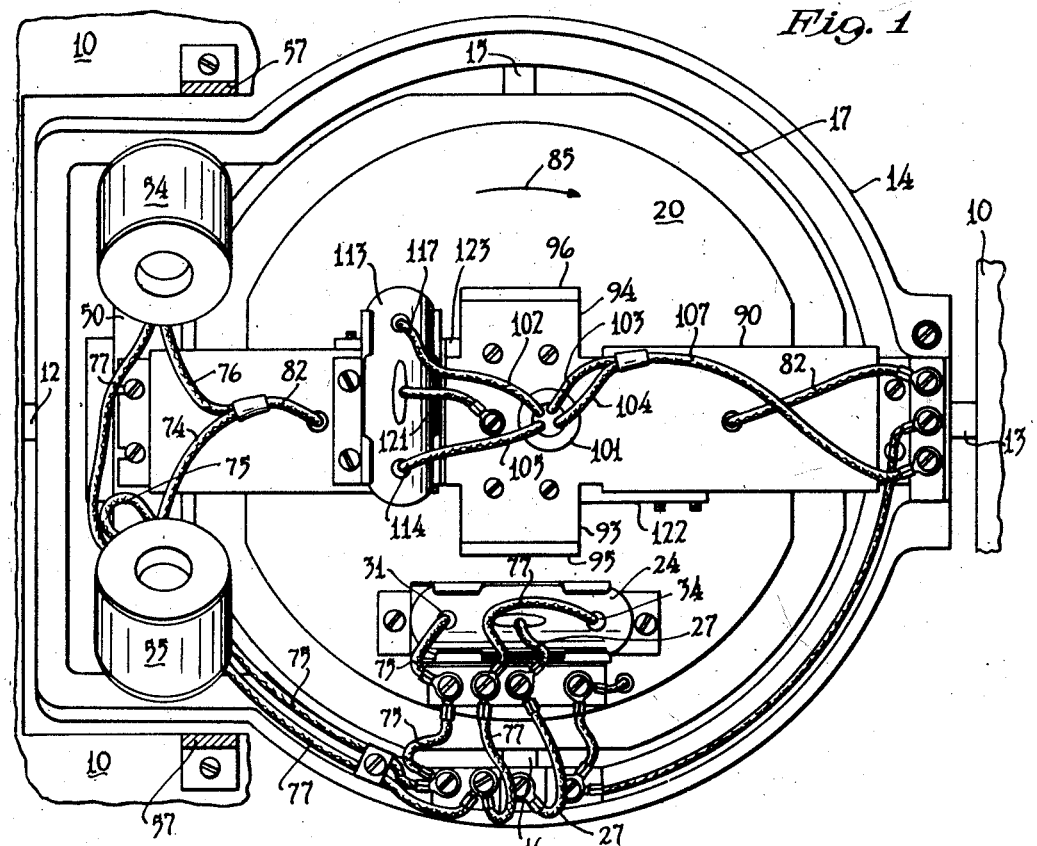

March 18, 1947.  F. P. STROTHER  2,417,573
MEANS FOR STABILIZING GYRO DEVICES
Filed April 7, 1943  4 Sheets-Sheet 1

Inventor
FRED P. STROTHER
By George H Fisher
Attorney

March 18, 1947. F. P. STROTHER 2,417,573
MEANS FOR STABILIZING GYRO DEVICES
Filed April 7, 1943 4 Sheets-Sheet 2
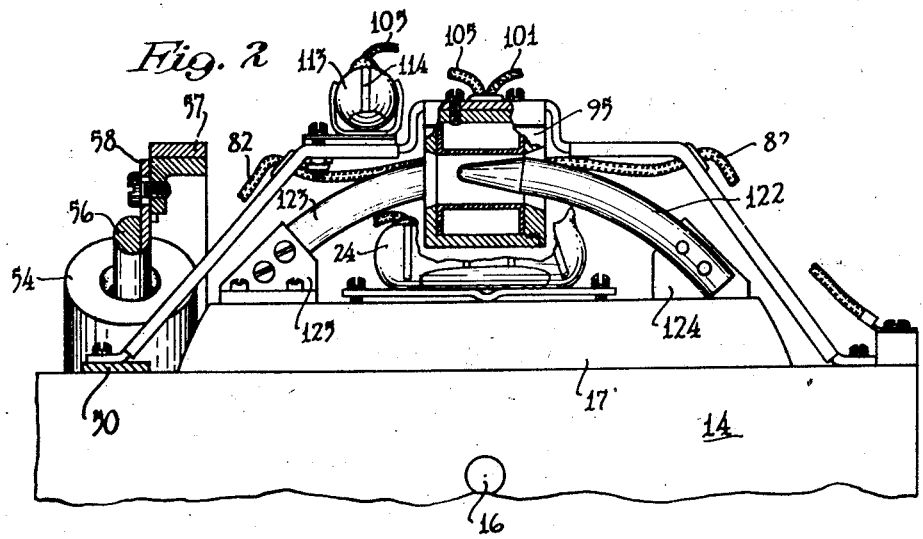
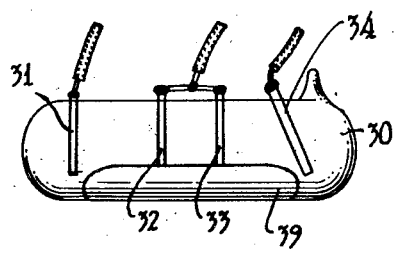
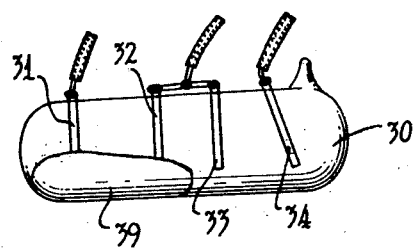
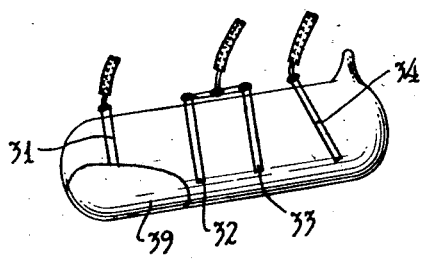
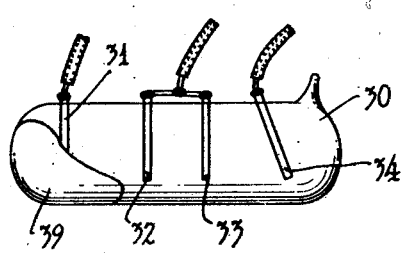
Inventor
FRED P. STROTHER
By
George H. Fisher
Attorney

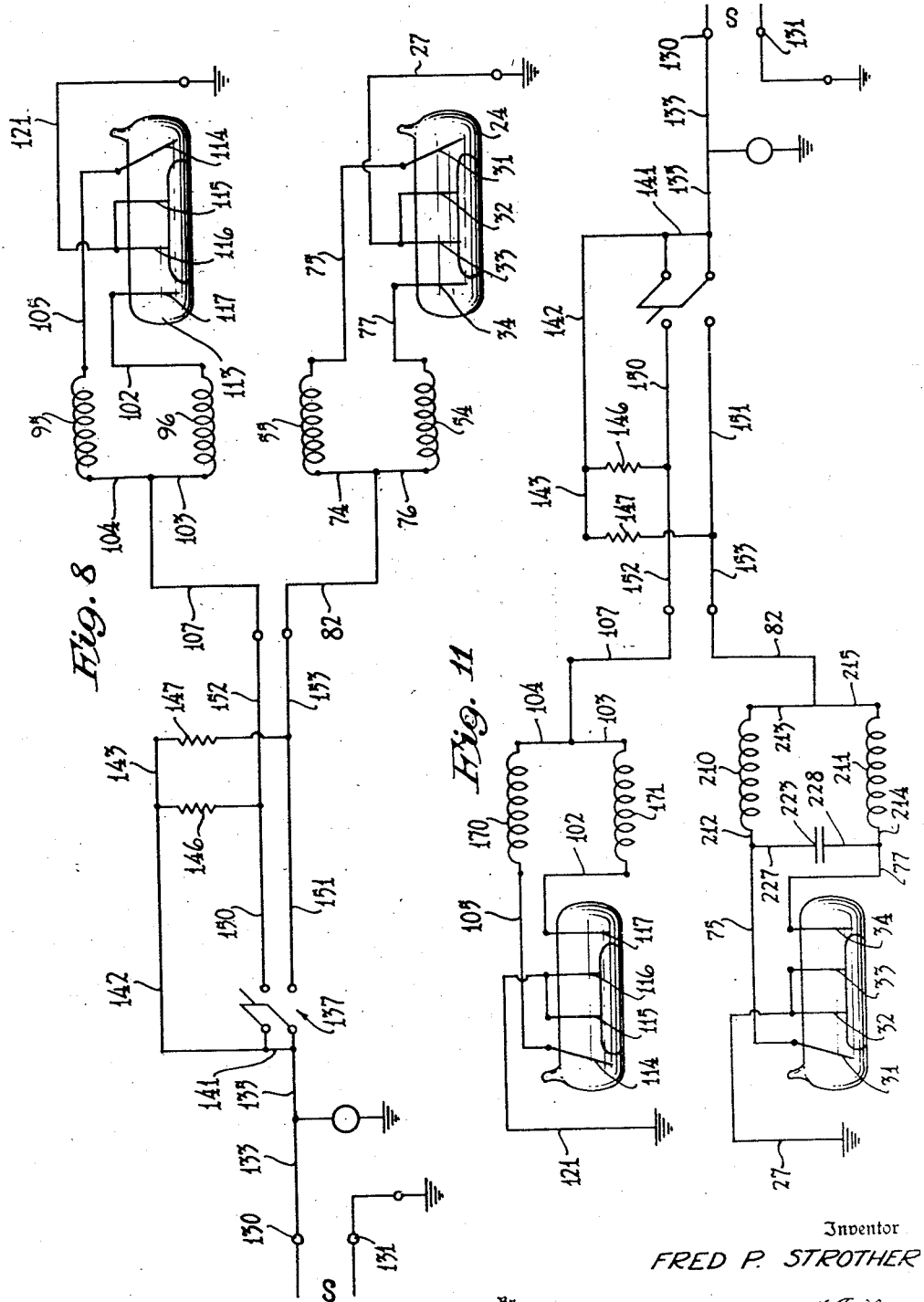

March 18, 1947. F. P. STROTHER 2,417,573
MEANS FOR STABILIZING GYRO DEVICES
Filed April 7, 1943 4 Sheets-Sheet 4
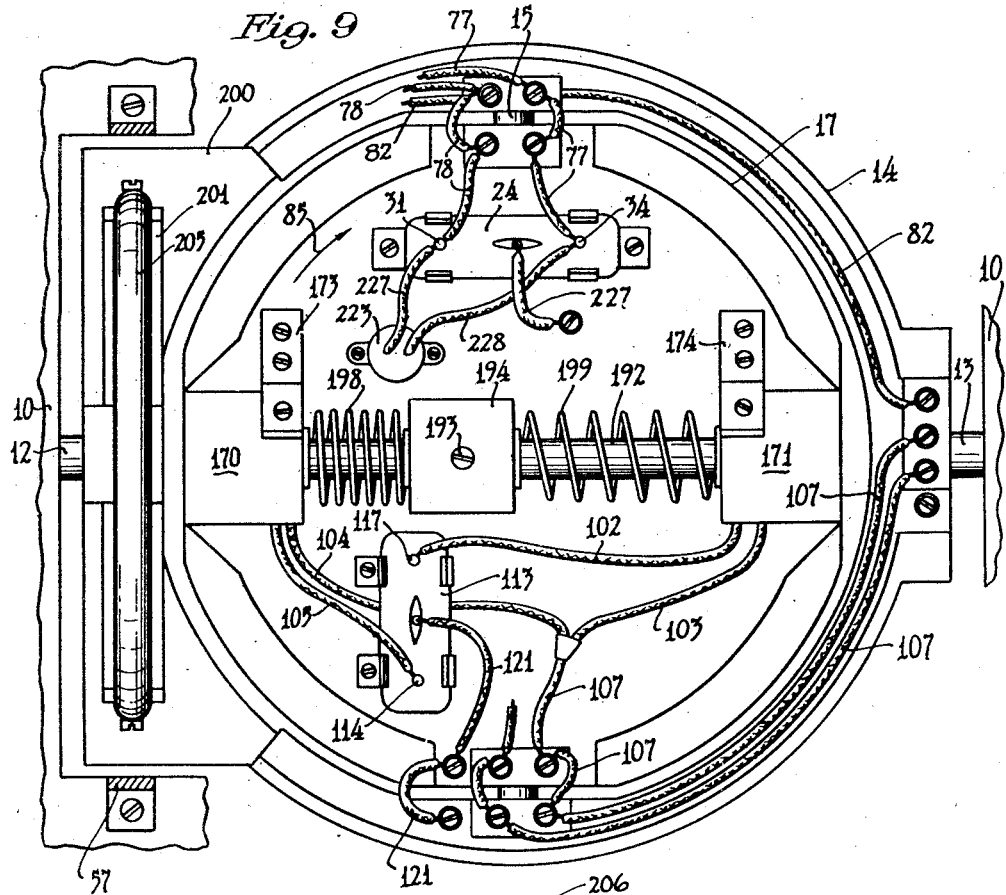
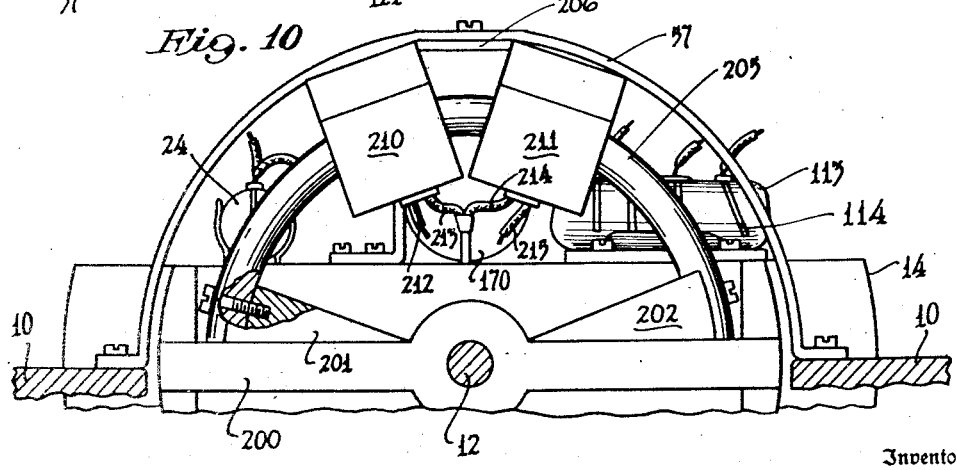
Inventor
FRED P. STROTHER
By
George H. Fisher
Attorney Patented Mar. 18, 1947

2,417,573

UNITED STATES PATENT OFFICE 2,417,573

MEANS FOR STABILIZING GYRO DEVICES

Fred P. Strother, Minneapolis, Minn., assignor to Minneapolis-Honeywell Regulator Company, Minneapolis, Minn., a corporation of Delaware Application April 7, 1943, Serial No. 482,217

4 Claims. (Cl. 74—5)

This invention comprises a method of stabilizing gyroscopic devices, and to means for carrying out this method. The invention relates more particularly to that form of stabilization which is referred to as erection of a gyroscope and which comprises maintaining the axis of rotation of the gyroscope vertical. The system is of more general utility, however, and may be adapted for general service in levelling and orientating devices not including gyroscopes.

Gyroscopes are now used in a wide diversity of applications. Automatic flight control and navigation instruments for aircraft; compasses, fire control instruments, anti-roll devices, and navigating instruments for marine craft; torpedo control; and stabilization of cameras and telescopes are among these applications, which even include the stabilization of monorail transportation systems. Thus it will be apparent that contributions promoting the stability and general satisfactory service of the gyroscope will be of wide utility, and this is of special interest in view of the fact so many applications of the gyroscope are to be found in military, naval and other defense installations.

The naked principle of the gyroscope may be stated thus: any body rotating, particularly at a fairly high angular velocity, about an axis tends to resist motion of that axis in any direction other than parallel to itself. Application of a force to the axis tending to rotate it out of this position causes a phenomenon known as precession of the gyroscope, that is, it effects a rotation of the axis of the gyroscope not in its own plane of action, but in a plane at an angle of 90 degrees with the plane of action of the force, the angle being measured in the direction of rotation of the gyroscope. These principles are well known and are restated here merely for purposes of completeness and clarity.

However, for a number of reasons, it has been found that in actual practice the axis of rotation of a gyroscopic instrument, originally orientated in a predetermined direction with respect to the earth (vertical, for example) suffers from a lack of stability due in part to the action of minor transient forces which cause precession and due in part to the fact that gyroscopic devices as now being used are transported over such a comparatively large portion of the earth's surface that the angle of convergence of vertical lines at two widely separated positions is of significant magnitude. A principal factor influencing the gyroscope is the diurnal rotation of the earth about its axis which produces an apparent rotation of the gyroscope through 360 degrees each 24 hours, and a deviation of proportionately smaller amounts for shorter periods of time. Complete stabilization of a gyroscopic device therefore must counteract transient precessing forces, however arising, and must also maintain the axis of the gyroscope in its predetermined direction throughout however great a passage of the device over the surface of the earth, and during however long a period of use of the gyroscope.

Devices for performing this function are not unknown. Yet in general they have appreciated the problem without actually providing satisfactory and generally acceptable solutions, particularly in devices adapted for use in aircraft wherein are encountered not only the transient distance phenomena referred to above, but also factors of great vibration, high acceleration and deceleration and enormous centrifugal forces, in directions and proportions completely uncalculable. A stabilizing device which depends on any one of these forces solely, or which may be unduly influenced by any of these forces, does not give satisfactory results.

The foregoing discussion should be sufficient to make evident one of the specific objects of my invention. Formally expressed, it is an object of my invention to provide a method which maintains the axis of a gyroscopic device in a predetermined direction to counteract distance, duration, and transient precessing effects, which is operative substantially solely as a result of the effect of gravitation, and which is rendered ineffectual by large distorting forces such as high centrifugal force, great acceleration, and so on.

Another object of my invention is to provide means for maintaining erection of a gyroscopic device by means of electromagnetically applied forces regulated in their applications by fluid switches operated by gravity and overridden by excessive centrifugal, angular, and acceleration forces.

More broadly, an object of my invention is to provide means for maintaining a body, mounted for substantially universal rotation, in a predetermined orientation.

Other objects and advantages of my invention will become clear from a study of the specification and subjoined claims, and of the drawings which are attached hereto and made a part hereof, and in which:

Figure 1 is a plan view of a portion of a device including an embodiment of my invention, certain parts being removed or broken away for the sake of more clearly showing the invention.

Figure 3:
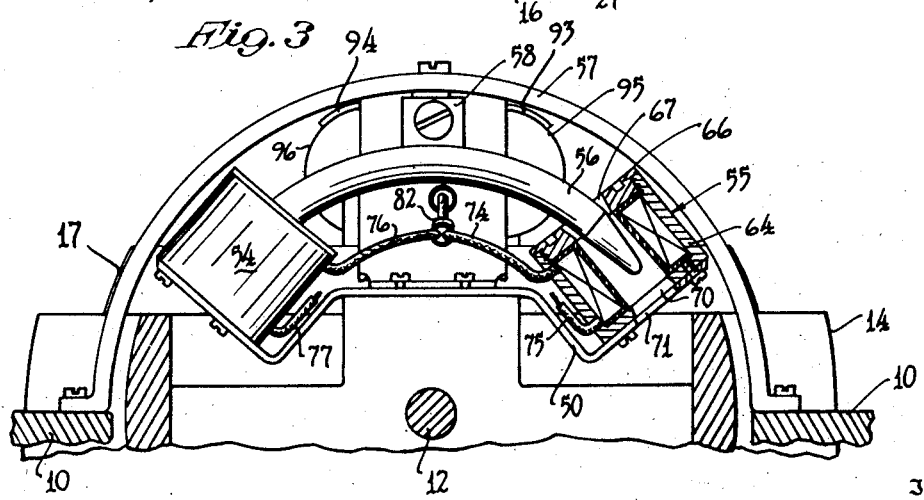

Figure 2 is a front elevation of the device pictured in Figure 1, certain parts being broken away or shown in section for the purpose of more clearly showing the invention, Figure 3 is an end view generally similar to Figure 2, looking from the left of Figure 1, and with certain portions omitted or broken away for purposes of illustration, Figures 4, 5, 6, and 7 are generally schematic drawings illustrative of the construction and operation of a fluid switch comprising a significant part of my invention, Figure 8 is a schematic wiring diagram showing the electrical circuit of this embodiment of my invention together with certain control members, Figure 9 is a view generally similar to Figure 1 but presenting a modification of my invention, Figure 10 is a view generally similar to Figure 3 but presenting the embodiment of my invention also shown in Figure 9, and Figure 11 is a schematic wiring diagram showing the electrical circuit of this embodiment of my invention, together with certain control members.

It will readily be appreciated that after a study of this disclosure of the method and means comprising my invention numerous variations in the electrical and mechanical elements required in an embodiment of the invention will occur to those skilled in the art. Therefore, the modifications of my invention which are shown and described herewith are to be considered as solely illustrative, and not in any sense as limitations.

In the modification of my invention best shown in Figures 1, 2, and 3, reference numeral 10 refers to a support comprising, for example, the walls of a receptacle fixedly housed in an aircraft. A cardanic carrier 14 has a pair of substantially coplanar and mutually perpendicular axes about which pairs of outwardly extending shafts 12 and 13 and inwardly extending shafts 15 and 16 are respectively concentric. Carrier 14 is mounted in support 10 for rotation about the axis of shafts 12 and 13, and within the carrier is mounted a housing 17 for rotation about the axis of shafts 15 and 16.

Within housing 17 is a conventional gyroscope together with means for maintaining it in rotation, the axis of rotation of the gyroscope being perpendicular to the axis determined by shafts 15 and 16. Mounted upon the upper surface 20 of housing 17, with its longitudinal axis in a plane perpendicular to the axis of rotation of the gyroscope, is a mercury switch 24. As shown in detail in Figure 4, the switch includes a glass envelope 30 sealed about a pair of end electrodes 31 and 34, and about a pair of center electrodes 32 and 33 which are electrically connected outside a tube. It also contains a quantity of mercury 39 sufficient to perform switching functions as follows. In the level position of the tube no electrical connection is made between the center electrodes and either end electrode. On a slight tilt of the switch in a selected direction the associated electrical circuit is closed, as in Figure 5 where electrical connection has been made between the center electrode 32 and electrode 31. It will be seen that rotation of housing 17 about the axis of shafts 15 and 16 tilts switch 24, and for moderate degrees of tilt causes a selected electrical connection to be made depending on the sense of the tilt.

The mercury switch comprises a significant part of my invention and is constructed with considerable accuracy. Referring again to Figures 4, 5, 6, and 7, when the envelope is exactly level, electrical connection is not made either between electrodes 31 and 32 or between electrodes 33 and 34. However, a very slight tilting (e. g., .1–.2 degree) of the envelope causes electrical connection to be made between one of these pairs of electrodes as shown in Figure 5. Further tilting of the switch produces no electrical change until the angle of tilt approximates ten degrees. The amount of mercury in the envelope and the relative lengths and positions of the electrodes as well as the diameter and length of the envelope itself are so calculated that on reaching this angle of tilt a condition illustrated by Figure 6 is attained, where the connection between electrodes 31 and 32 is again interrupted. It will also appear that even should the tube be in its level position, if large centrifugal or acceleration forces are applied, the mercury is thrown to one end of the tube, as shown in Figure 7, and electrical connection between the controlling electrodes is again interrupted. Thus, it will be seen that forces other than gravity will not have misleading effects upon members energized by action of the switch, and that the switch will not misleadingly energize the members in response to extreme sudden deviations of its axis from the horizontal such as may occur, for example, during a power dive of the craft or during other unusual flight evolutions.

As best shown in Figure 3, a pair of electromagnetic members 54 and 55 are supported on a bracket 50 for cooperation with an armature 56 in the form of an arcuate rod of magnetic material. The armature is mounted on a ring 57, carried on support 10, by a bracket assembly 58. Member 55 is comprised of a cup 64 having its open end screw-threaded to receive a cap 66. Apertures 67 and 70 are provided in the cap and cup, and aperture 71 is provided in bracket 50; these apertures are aligned to permit the passage of the member over armature 56. Cup 64 and cap 66 enclose a coil having lead wires 74 and 75. Member 54 is constructed in the same fashion and has lead wires 76 and 77.

The plane of the axes of members 54 and 55 and of armature 56 is substantially perpendicular to the longitudinal axis of switch 24. Since electromagnet members 54 and 55 are mounted in the carrier 14 for unitary movement therewith, and armature 56 is fixed to support 10, selective rotation of carrier 14 about the axis of shafts 12 and 13 causes selective insertion of armature 56 into the electromagnet members. Conversely, energization of one of the electromagnet members, e. g. member 55, urges the member to take a position at the center of the armature and therefore exerts a rotary force urging carrier 14 to rotate in a counterclockwise direction with respect to support 10, as seen in Figure 3.

Since the rotation of the gyroscope itself is in a clockwise direction, as indicated by arrow 85 in Figure 1, the force applied by energization of member 55 emerges as precession of the gyroscope and its housing in a direction to tilt the housing 17 about the axis of shafts 14 and 15 so as to cause the right hand end of housing 17, as shown in Figure 1, to be lowered and the left hand end to be raised.

Energization of member 54 urges the member to take a position at the center of the armature and therefore exerts a rotary force urging carrier 14 to rotate in a clockwise direction with respect to support 10, as seen in Figure 3. Since the rotation of the gyroscope itself is in a clockwise direction, the force applied by energization of member 54 emerges as precession of the gyroscope and its housing in a direction to tilt housing 17 about the axis of shafts 14 and 15 so as to cause the right-hand end of the housing, as shown in Figure 1, to be raised and the left-hand end to be lowered.

A bridge member 90 is supported at its ends on carrier 14, and is of arch construction so that it will not interfere with normal precessive movement of the housing. It is provided with central extensions 93 and 94, and these extensions support a pair of electromagnet members 95 and 96. The construction of these members is the same as that set forth in detail in connection with member 55, and this description will not be repeated. A bushing 101 is provided in bridge member 90, and through this bushing pass lead wires 102, 103, 104, and 105. Lead wires 102 and 103 are connected to the ends of the winding of member 96, and lead wires 104 and 105 are connected to the ends of the winding of member 95.

A second mercury switch 113 is mounted transversely of bridge 90, with its longitudinal axis parallel to the axis of shafts 15 and 16. Switch 113 has electrodes 114, 115, 116, and 117 corresponding respectively to electrodes 31, 32, 33, and 34, of which it is a duplicate. It will be seen that rotation of carrier 14 about the axis of shafts 12 and 13 tilts switch 113 to a moderate degree, causes a selected electrical connection to be made, depending on the sense of the tilt.

Rigidly supported upon the upper surface 20 of housing 17 are a pair of arcuate members 122 and 123 of magnetic material, magnetically interengaging respectively with electromagnet members 95 and 96. In the normal position of the housing with respect to the carrier, an end of each of these arcuate members is interengaged with one of the coils, and it will be seen that the normally interengaging ends are tapered. The remaining ends of members 122 and 123 are supported upon the housing as by brackets 124 and 125. Thus, on rotation of the housing with respect to the carrier, one of the arcuate members becomes more completely interengaged with one of the electromagnet members, while the other arcuate member becomes more completely disengaged from the other electromagnet member. Conversely, if one of the electromagnet members, e. g., member 95, is energized, the attraction between this member and its coacting arcuate member urges the housing to rotate in such a direction as to insert arcuate member 122 more completely into member 95.

Due, as explained above, to the direction of rotation of the gyroscope, force applied by energization of member 95 emerges as precession of the gyroscope to rotate carrier 14 about the axis of shafts 12 and 13 so that the upper portion of the carrier as illustrated is lowered and the lower portion is raised. Similarly, energization of member 96 causes the opposite effect.

Operation

The operation of the device is best illustrated in the wiring diagram of Figure 8 which also shows certain control features not a physical part of the gyroscope itself. In this figure electromagnet members 54, 55, 95, and 96 and mercury switches 24 and 113 are identified by reference numerals. The diagram also shows a pair of resistors 146 and 147, a double pole single throw switch 137, and a source of electrical energy indicated by terminals 130 and 131. Terminal 131 is grounded as illustrated, as are the center electrodes 32, 33, 115, and 116 of mercury switches 24 and 113. The switches are shown in the neutral position in the figure, and so no complete electrical circuit is present between terminals 130 and 131.

Assume that switch 113 is tilted in a counterclockwise direction as seen in Figure 8. An electrical circuit is now set up as follows: terminal 130, conductors 133, 135, 141, 142, resistor 146, conductors 152, 107, 103, electromagnet member 96, conductor 102, electrode 117, the mercury, electrode 116, conductor 121, ground, and back to terminal 131.

Assume the switch 113 is tilted in a clockwise direction. An electrical circuit is now set up as follows: terminal 130, conductors 133, 135, 141, 142, resistor 146, conductors 152, 107, 104, electromagnet member 95, conductor 105, electrode 114, the mercury, electrode 115, conductor 121, ground, and back to terminal 131.

It is obvious that only one of these circuits can exist at a time.

Assume that switch 24 is tilted in a counterclockwise direction as seen in Figure 8. An electric circuit is set up as follows: terminal 130, conductors 133, 135, 141, 142, 143, resistor 147, conductors 153, 82, 76, electromagnet member 54, conductor 77, electrode 34, the mercury, electrode 33, conductor 27, ground and back to terminal 131.

Assume that switch 24 is tilted in a clockwise direction. An electrical circuit is set up as follows: terminal 130, conductors 133, 135, 141, 142, 143, resistor 147, conductors 153, 82, 74, electromagnet member 55, conductor 75, electrode 31, the mercury, electrode 32, conductor 27, ground, and back to terminal 131.

It is obvious that only one of these circuits can exist at a time. It is also obvious that either of these circuits can exist at the same time as either of the circuits controlled by switch 113.

Assume switch 137 to be closed. Now the electrical circuit comprising conductors 141 and 142, and resistance 146 is shunted out by the switch and conductor 150, and the circuit of conductors 141, 142, and 143 and resistance 147 is shunted out by the switch and conductor 151. By this means the IR drops across resistors 146 and 147 are eliminated and higher electric potentials are impressed across the terminals of the electromagnet members by operation of the mercury switches, causing a more rapid erection of the gyroscope when desired; for example, when it is first put into operation. Continued use of so great electrical energy tends to cause hunting of the various stabilizing circuits, and after an approximate erection is reached switch 137 is opened and the devices are operated on the smaller supply of electrical energy.

The fundamental operation of this modification of my invention will now be summarized briefly, reference being made once more to Figures 1 to 3.

A. If for any of the causes pointed out above, the axis of switch 24 departs from the horizontal by more than about .2 degree and by less than about 10 degrees, in a direction to lower electrode 31 as seen in Figure 1, an electric circuit is made by the mercury switch energizing electromagnet member 55. Magnetic reaction between this member and armature 56 applies a force tending to rotate carrier 14 about the axis of shafts 12 and 13 in a counterclockwise direction as seen in Figure 3. Due to the direction of the rotation of the gyroscope, this force emerges as precession of the axis of the gyroscope in a clockwise direction as seen in Figure 2, which relevels the mercury switch. If the departure of the axis of switch 24 from the horizontal is more than about 10 degrees, this application of erecting force will be interrupted.

B. If the axis of switch 24 is similarly tilted in the opposite direction, the effect will be opposite.

C. If the axis of switch 113 departs from the horizontal by more than about .2 degree and less than about 10 degrees in a direction to lower electrode 117 as seen in Figure 1, an electric circuit is made by the mercury switch energizing electromagnet member 96. Magnetic reaction between this member and armature 122 applies a force tending to rotate housing 17 about the axis of shafts 15 and 16 in a clockwise direction as seen in Figure 2. Due to the direction of rotation of the gyroscope, this force emerges as precession of the axis of the gyroscope in a clockwise direction as seen in Figure 3, which relevels the mercury switch. If the departure of the axis of switch 113 from the horizontal is more than about 10 degrees, application of this force will be interrupted.

D. If the axis of switch 113 is similarly tilted in the opposite direction, the effect will again be opposite.

Turning now to Figures 9 and 10, I will describe a second modification of my invention. Since many elements are common to this modification and to that previously described, like reference numerals will be used to refer to like parts of both embodiments. The general arrangement of support, cardanic carrier, gyroscope and housing is the same as that previously disclosed. Switch 113 is mounted directly on housing 17 instead of being supported on a bridge member. It will be noted that switches 24 and 113 are again mounted in planes mutually perpendicular, and in planes perpendicular to the cardan axis of the gyroscope.

A pair of electromagnet members 170 and 171 are mounted on housing 17 by brackets 173 and 174, respectively. These members are similar in construction to member 55 previously discussed in detail, with the exception that no hole is provided in the bottom of the cup member for armature passage therethrough. The members are mounted coaxially, with the axis extending perpendicular to the axis of rotation of the gyroscope and to the axis determined by shafts 15 and 16. Member 70 is provided with conductors 104 and 105 and member 171 is provided with conductors 102 and 103.

An armature 192 of magnetic material is arranged for selectively variable interengagement with members 170 and 171. This armature is so proportioned that when one extremity of the armature is inserted as far as it will go into one of the electromagnet members, the other end of the armature is still engaged within the other electromagnet member to a sufficient extent to give it support. Secured to the mid point of armature 192 as by set screw 193 is a weight 194. A pair of mechanically equal springs 198 and 199 are provided between weight 194 and electromagnet members 170 and 171, respectively, to bias armature 192 to take a middle position with relation to the electromagnet members. In the figure the armature is shown displaced to the left from this middle position. Accordingly, it will be seen that the armature is arranged for relative sliding movement on both sides of a normal position with respect to the electromagnet members, in accordance with selective energization of the members. By this arrangement I have provided for a downward gravitational force to be applied on the housing to the left of the axis of shafts 15 and 16 when armature 192 is inserted to its fullest extent in electromagnet member 170, and to the right of the axis of shafts 15 and 16 when armature 192 is inserted to its fullest extent in electromagnet member 171. As previously explained, these forces are translated into precession of the axis of rotation of the gyroscope about the axis of shafts 12 and 13, the force being transmitted through shafts 15 and 16.

In this embodiment of my invention, carrier 14 is provided with an extension 200 having a pair of abutments 201 and 202 for mounting an annular member 205 of magnetic material. Obviously, any other method of fastening member 205 to member 200 can be used. Ring 57 is supported from the housing 10 and carries at its center a bracket 206, to which are mounted electromagnet units 210 and 211. Member 210 is provided with conductors 212 and 213 and member 211 is provided with conductors 214 and 215. An electrical condenser 223 of any suitable design as shown conventionally in Figure 9 is fixed to the housing.

*Operation*

The operation of this modification of my invention is most clearly shown in Figure 11, in which elements having reference numerals smaller than 153 are the same as those previously disclosed in Figure 8, and have the same functions. The figure shows the mercury switches in the level position, and no electrical circuit is completed between grounded input terminal 131 and the other input terminal 130.

Assume switch 113 is tilted in a counterclockwise direction as seen in Figure 10. Then an electric circuit is completed as follows: terminal 130, conductors 133, 135, 141, 142, resistor 146, conductors 152, 107, 103, member 171, conductor 102, electrode 117, the mercury, electrode 116, conductor 121, ground, and back to terminal 131.

Assume switch 113 is tilted in a clockwise direction as seen in Figure 11. Then an electric circuit is completed as follows: terminal 130, conductors 133, 135, 141, 142, resistor 146, conductors 152, 107, 104, member 170, conductor 105, electrode 114, the mercury, electrode 115, conductor 121, ground, and back to terminal 131.

It is obvious that only one of these circuits can exist at a time.

Assume switch 24 is tilted in a clockwise direction as viewed from shaft 16. Then an electric circuit is completed as follows: terminal 130, conductors 133, 135, 141, 142, 143, resistor 147, conductors 153, and 82; conductor 213, member 210, conductors 212, 227, condenser 223, and conductor 228; or conductor 215, member 211, and conductor 214; conductor 77, electrode 34, the mercury, electrode 33, conductor 27, ground, and back to terminal 131.

Assume switch 24 is tilted in a counterclockwise direction as viewed from shaft 16. Then an electric circuit is closed as follows: terminal 130, conductors 133, 135, 141, 142, 143, resistor 147, conductors 153, and 82; conductor 215, member 211, conductors 214, 228, condenser 223, and conductor 227; or conductor 213, member 210, and conductor 212; conductor 75, electrode 31, the mercury, electrode 32, conductor 27, ground and back to terminal 131.

It is obvious that only one of these circuits can exist at a time. It is also obvious that either of these circuits can exist with either of the two circuits controlled by switch 113.

When electrical connection is made by the mercury switch between electrodes 31 and 32, electrical energy in the form of alternating current is supplied to electromagnet member 210 directly and is also supplied to electromagnet member 211 through condenser 223. The capacitance of condenser 223 is so chosen with regard to the inductance of the electromagnet members, which are electrically identical, that the alternating current in member 210 is maintained 90 degrees out of phase with that in member 211, and a magnetic field advancing through the members in a counter clockwise deviation, as seen in Figure 10, is set up in a manner which is in some respects analogous to the appearance of the rotating field of an induction motor. This advancing magnetic field tends to move armature 205 with respect to the electromagnet members so as to urge rotation of the carrier 14 about the axis of shafts 12 and 13 in the same direction, and this in turn, causes precession of the axis of rotation of the gyroscope around the axis of shafts 15 and 16 as previously explained.

When electrical connection is made by the mercury between electrodes 33 and 34, on the other hand, alternating current is supplied to electromagnet member 211 directly and to member 210 through the condenser. The phase angle between the two currents is now opposite to what it was before and the advance magnetic field moves through the coils in the opposite direction, producing a rotative effect opposite to that just described.

The operation of this modification of my invention will now be summarized briefly, reference being made once more to Figures 9 and 10.

A. If for any reason the axis of mercury switch 24 departs from the horizontal by more than about .2 degree and by less than about 10 degrees, in a direction to lower electrode 31, an electric circuit is made by the switch energizing electromagnet member 210 directly and electromagnet member 211 through condenser 223. The interaction of the resulting advancing magnetic field with armature 205 applies rotational force about the axis of shafts 12 and 13 in a counter clockwise direction as seen in Figure 10. This force emerges as precession of the gyroscope causing rotation of housing 17 about the axis of shafts 15 and 16 in a direction to raise electrode 31 of switch 24 and interrupt the energization of members 210 and 211. If the departure of the axis of switch 24 from the horizontal is more than about 10 degrees, this application of erecting force will be interrupted.

B. If the axis of switch 24 departs similarly from the horizontal in the opposite direction the effect will be opposite.

C. If for any reason the axis of switch 113 departs from the horizontal by more than about .2 degree and by less than about 10 degrees, in a direction to lower electrode 114 an electric circuit is made by the switch energizing electromagnet member 170. Magnetic reaction between this member and armature 192 draws the armature to the left as shown in Figure 9, thus applying a downward gravitational force tending to cause rotation of housing 17 about the axis of shafts 15 and 16. This force emerges as precession of the gyroscope transmitted through shafts 15 and 16 and causing rotation of the carrier about the axis of shafts 12 and 13 in a counter clockwise direction as seen in Figure 10, releveling the switch.

D. If the axis of switch 113 departs similarly from the horizontal in the opposite direction, the result will be opposite.

I have clearly disclosed above my method of maintaining erection of a gyroscope, and preferred embodiments for bringing about this desired regulation of the instrument. As I have pointed out, substitutions and expedients will immediately become apparent to those skilled in the art after a study of my specification, and I do not wish to be limited in my protection to the disclosure herein above presented, which is made solely by way of illustration, but only by the subjoined claims.

I claim as my invention:

1. In combination, a gyroscope having a normally vertical axis of rotation and including means maintaining rotation of said gyroscope, a housing for said gyroscope, a cardanic carrier, said housing being pivoted to said carrier for rotation about a first axis which is in a plane perpendicular to said axis of rotation, a support, said carrier being pivoted to said support for rotation about an axis which is in planes perpendicular to said first axis and to the normal direction of said axis of rotation, a first fluid switch member actuable from an inoperative position to opposite, operative positions in response to rotation of said housing about said first axis, first electromagnetic means oppositely energizable by said first switch member to apply opposite rotative forces about said second axis on moderate deviation of said axis of rotation from the vertical, whereby to cause opposite precessive movements of said axis of rotation about said first axis, a second fluid switch member actuable from an inoperative position to opposite, operative positions in response to rotation of said carrier about said second axis, and second electromagnetic means oppositely energizable by said second switch member to apply opposite rotative forces about said first axis on moderate deviation of said axis of rotation from the vertical about said second axis whereby to cause opposite precessive movements of said axis of rotation about said second axis, said switch members including means cooperating to interrupt action of said electromagnetic means in the event of excessive deviation of said axis of rotation from the vertical in either direction, said first electromagnetic means comprising magnetically interengaging members carried by said carrier and said support, said second electromagnetic means comprising magnetically interengaging members carried by said housing and said carrier, one of said electromagnetic means comprising a pair of electromagnet elements and a pair of arcuate elements of magnetic material arranged for opposite variable magnetic interengagement with respective electromagnet elements of said pair, electrical energy being oppositely supplied to said electromagnet elements in accordance with the response of one of said fluid switch members, the other of said electromagnetic means comprising a first assembly including a pair of electromagnet elements and a second assembly including an arcuate element of magnetic material arranged for opposite variable magnetic interengagement with respect to the electromagnet elements of said first assembly, electrical energy being oppositely applied to said electromagnet elements in accordance with the response of the other of said fluid switch members.

2. In a direction maintaining device, a member and means normally maintaining an axis of said member in a predetermined direction, said means comprising normally deenergized, variously energizable electromagnetic means for applying force upon selective energization to cause opposite rotative movements of said member, and level responsive fluid switch means actuable from an inoperative position through a plurality of operative positions to a like plurality of inoperative positions, selective operation of said switch means selectively actuating said electromagnetic means in accordance with deviation of said axis of said member from said predetermined direction, said switch means comprising an elongated electrically non-conducting envelope, electrodes projecting into said envelope, and electrically conducting fluid in said envelope, the spacing of said electrodes and the quantity of said fluid being so chosen that when said fluid is in the center of said envelope no electrical connection is made, when said fluid is moved slightly toward a selected end of said envelope a selected electrical connection is made, and when said fluid moves further toward said end of said envelope said electrical connection is interrupted.

3. In a direction maintaining device, a member, first and second fluid switch members mounted in fixed relation to an axis of said member for respective displacement from inoperative position to opposite, operative positions in response to opposite deviations of said axis, from a predetermined direction, about first and second axes, and first and second normally deenergized electromagnetic means oppositely energizable by displacement of said switch members for applying forces to return said axis of said member to the said predetermined direction on moderate deviation of said axis of rotation from said predetermined direction, operation of said switch members further interrupting action of said electromagnetic means in the event of excessive deviation of said axis of said member from said predetermined direction, each of said switch members comprising an elongated electrically non-conducting envelope, electrodes projecting into said envelope, an electrically conducting fluid in said envelope, the spacing of said electrodes and the quantity of such fluid being so chosen that when said fluid is in the center of said envelope no electrical connection is made, when said fluid moves slightly toward a selected end of said envelope a selected electrical connection is made, and when said fluid moves further towards said end of said envelope, said electrical connection is interrupted.

4. In a gyroscopic apparatus, a gyroscope and means normally maintaining the axis of rotation of said gyroscope in a predetermined direction; said means comprising normally deenergized electromagnetic means effective upon energization to apply forces causing said gyroscope to precess, level responsive fluid switch members for causing energization of said electromagnetic means, and means mounting said level responsive members upon said gyroscope in level position when the axis of rotation of said gyroscope is in said predetermined direction; each said switch member comprising mutually independent means cooperating to complete electric circuits through said electromagnetic means on moderate departure of said member from level in either direction and further mutually independent means cooperating to interrupt said circuits on extreme departure of said member from level in either direction.

FRED P. STROTHER.

REFERENCES CITED

The following references are of record in the file of this patent:

UNITED STATES PATENTS

| Number | Name | Date |
|---|---|---|
| 1,981,687 | Carter | Nov. 20, 1934 |
| 875,036 | Ach | Dec. 31, 1907 |
| 1,923,290 | Wood | Aug. 22, 1933 |
| 1,782,048 | Mills | Nov. 18, 1930 |
| 1,405,807 | Tanner | Feb. 7, 1922 |
| 2,232,627 | Olson | Feb. 18, 1941 |
| 2,367,465 | Kunzer | Jan. 16, 1945 |
| 2,087,961 | Anscott | July 27, 1937 |
| 2,041,526 | Carter | May 19, 1936 |
| 1,942,737 | Wood | Jan. 9, 1934 |
| 1,763,806 | Methvin | June 17, 1930 |
| 349,208 | Angeloni | June 9, 1937 |
| 2,109,953 | Bates | Mar. 1, 1938 |
| 898,766 | Mott | Sept. 15, 1908 |

FOREIGN PATENTS

| Number | Country | Date |
|---|---|---|
| 585,697 | German | Feb. 22, 1934 |
| 148,635 | British | July 29, 1920 |
| ?49,208 | Italian | June 9, 1937 |

OTHER REFERENCES

A. P. C. application of Lauck, Serial No. 381,604, published May 4, 1943.